United States Patent
Brice et al.

(10) Patent No.: US 7,871,041 B2
(45) Date of Patent: Jan. 18, 2011

(54) SYSTEM, METHOD, AND APPARATUS FOR LEADING EDGE STRUCTURES AND DIRECT MANUFACTURING THEREOF

(75) Inventors: Craig A. Brice, Keller, TX (US); Brian T. Rosenberger, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 462 days.

(21) Appl. No.: 11/873,439

(22) Filed: Oct. 17, 2007

(65) Prior Publication Data

US 2009/0101755 A1    Apr. 23, 2009

(51) Int. Cl.
*B64C 1/00* (2006.01)
(52) U.S. Cl. .................. 244/123.7; 244/123.1; 244/124; 416/241 B
(58) Field of Classification Search ............... 244/123.7, 244/123.1, 124, 123.14, 123.4; 416/241 B, 416/241 R
See application file for complete search history.

(56) References Cited

U.S. PATENT DOCUMENTS

| | | | | |
|---|---|---|---|---|
| 3,176,775 | A * | 4/1965 | Clemens | 416/230 |
| 4,232,093 | A * | 11/1980 | Miller | 428/591 |
| 6,234,423 | B1 * | 5/2001 | Hirahara et al. | 244/123.7 |
| 6,237,873 | B1 * | 5/2001 | Amaoka et al. | 244/123.7 |
| 6,451,413 | B1 * | 9/2002 | Aurenty et al. | 428/195.1 |
| 6,475,320 | B1 * | 11/2002 | Masugi | 156/189 |
| 6,746,755 | B2 * | 6/2004 | Morrison et al. | 428/166 |
| 7,066,717 | B2 * | 6/2006 | Morrison et al. | 416/230 |
| 7,182,293 | B2 * | 2/2007 | Sarh | 244/123.7 |

* cited by examiner

*Primary Examiner*—Christopher P Ellis
(74) *Attorney, Agent, or Firm*—Bracewell & Giuliani LLP

(57) ABSTRACT

Leading edge structures for high performance aircraft and the direct manufacture thereof are disclosed. Direct manufacturing technology is used to deposit leading edge structures directly from a digital model to form near-net shape products. This technique permits a wider range of materials to be utilized, such as casting alloys capable of the highest temperature usage that are not available in billet or sheet form. Refractory metals or high temperature ceramics also may be used to form the entire lead edge structure, or just a replaceable tip of the leading edge structure.

14 Claims, 4 Drawing Sheets

SYSTEM, METHOD, AND APPARATUS FOR LEADING EDGE STRUCTURES AND DIRECT MANUFACTURING THEREOF

BACKGROUND OF THE INVENTION

1. Technical Field

The present invention relates in general to high speed aircraft and, in particular, to an improved system, method, and apparatus for direct manufacturing of leading edge structures for high speed aircraft.

2. Description of the Related Art

Tight-radiused leading edge structures on high speed air vehicles can experience very high operating temperatures while in service. Conventional manufacturing approaches, such as machining from billets of material, sheet metal forming, etc. have been used to fabricate such structures. These methods are expensive and slow, and they also are limited as to the types of materials that can be machined and/or bent into appropriate shapes. Depending on which existing method is used, there are additional geometric limitations to the types of leading edges that can be produced. Thus, an improved system, method, and apparatus for fabricating leading edge structures would be desirable. The ability to fabricate such structures out of high temperature materials in a quick and cost-effective manner would be even more beneficial.

SUMMARY OF THE INVENTION

Embodiments of a system, method, and apparatus for leading edge structures for high performance aircraft and for the direct manufacture thereof are disclosed. The invention leverages direct manufacturing technology to deposit leading edge structures directly from a digital model. Instead of sheet metal bending or bulk machining approaches, this method deposits material into a near-net shape product, saving considerable time and cost in fabricating these structures as well as allowing a wider range of materials to be utilized.

In addition, the invention permits a wider variety of materials to be employed for very demanding applications. Some alloys that are capable of the highest temperature usage are not available in billet form for machining, or in sheet form for bending. The deposition method of the invention allows for the use of casting materials that otherwise could not be considered. Turbine blade alloys (e.g., Inconel 100) with very high use temperatures may be used to directly manufacture thin-walled leading edge structures. Refractory metals (e.g., W, Ta, Re, etc.), alloys (IN625, UDIMET 720, W-Re) or high temperature ceramics also may be used for such purposes. These materials may be used for the entire leading edge structure, or just for the tip of the leading edge structure. Such tip designs may be configured to be replaceable or repaired as needed with, e.g., tolerance-fit, keyway-jointed, or other assembly techniques.

In one embodiment, cooling channels may be incorporated into the structure. By actively cooling the leading edge structures, for example, temperature use of a given material may be expanded in a manner similar to the way turbine blades are made with active cooling channels to allow for higher temperature use.

In other embodiments, stiffening elements may be incorporated into the structure to permit weight to be minimized by tailoring the structure to given design loads. In addition, the invention allows for a variable geometry along the span of the leading edge. Again, this would allow structural and aerodynamic tailoring of a leading edge based on thermal, aerodynamic or structural requirements. In still another embodiment, self-locating features may be built into the structure to allow for a low tooling and/or tool-free assembly. For example, a tongue-and-groove configuration would allow sections to be assembled and then permanently joined (e.g., welded, bonded, etc.). Self-locating features also may be included to readily allow for integration with the leading edge spar.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
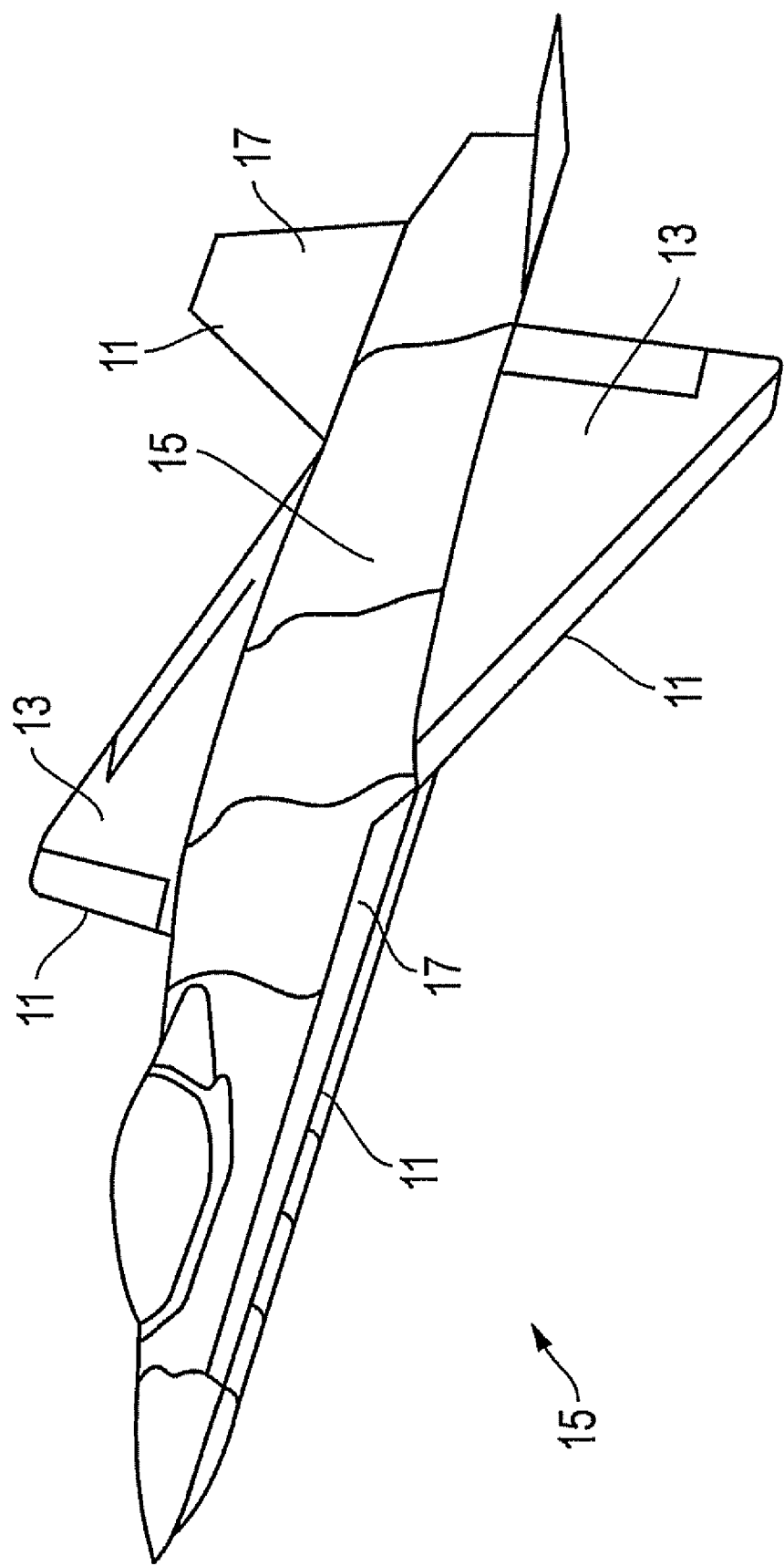
FIG. 1 is an isometric view of one embodiment of an aircraft constructed in accordance with the invention.
Figure 2:
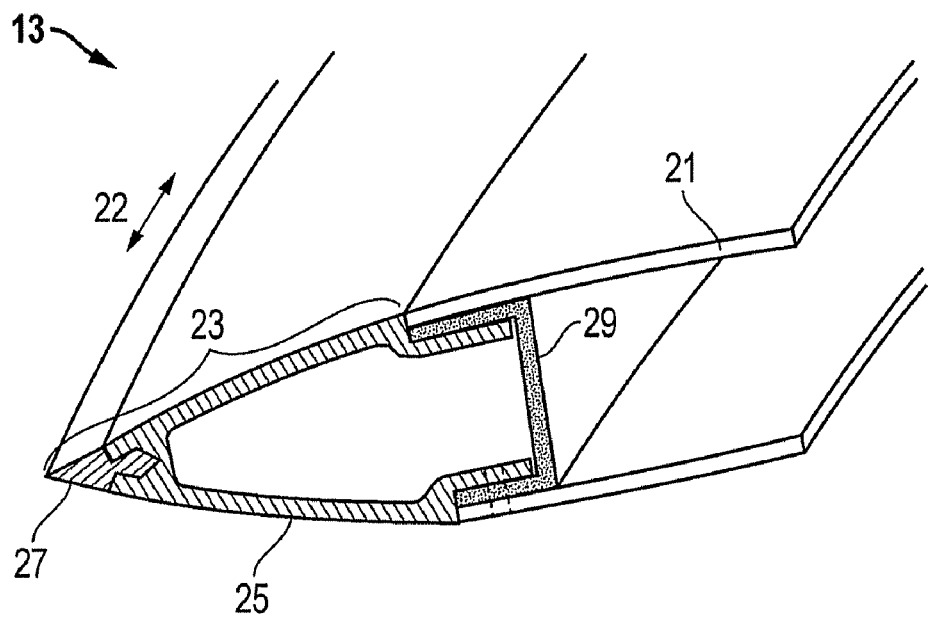
FIG. 2 is an enlarged isometric view of a portion of one embodiment of a leading edge structure constructed in accordance with the invention.

Referring to FIGS. 1-5, embodiments of a system, method and apparatus for directly manufacturing tightly-radiused structures from digital models are shown. The invention is well suited for fabricating leading edge structures 11 (FIG. 1) on wings 13 and other features 17 of a high speed aircraft 15 for better performance at higher operational temperatures.

In one embodiment, the aircraft wing 13 (FIG. 2) may comprise a wing box 21 having a fixed leading edge assembly 23 that may be joined to the wing box 21 at the leading edge spar 29. The leading edge assembly 23 may comprise an aft section 25 and a replaceable tip 27. The replaceable tip 27 may be mated to the aft section of the leading edge assembly with a mechanical assembly technique such as a tolerance fit, keyway joint or other methods. Significantly, the leading edge assembly 23 may be fabricated with a variable geometry extending along the direction 22 defined by the leading edge such that it is non-symmetrical or non-uniform along the span.

Figure 3:
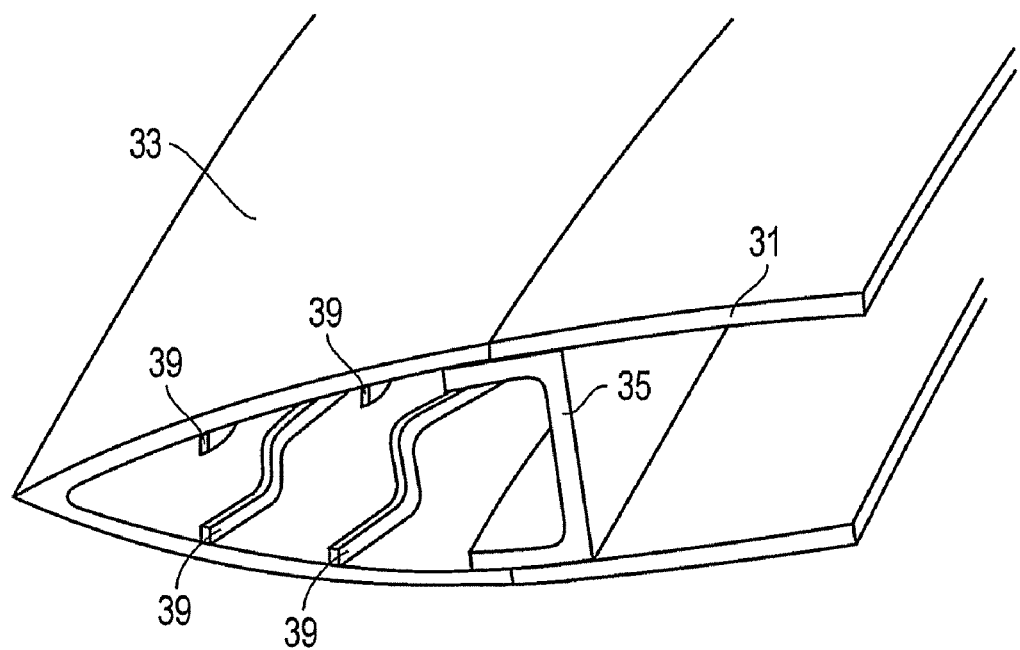
FIG. 3 is an isometric view of another embodiment of a leading edge structure constructed in accordance with the invention.
Figure 4:
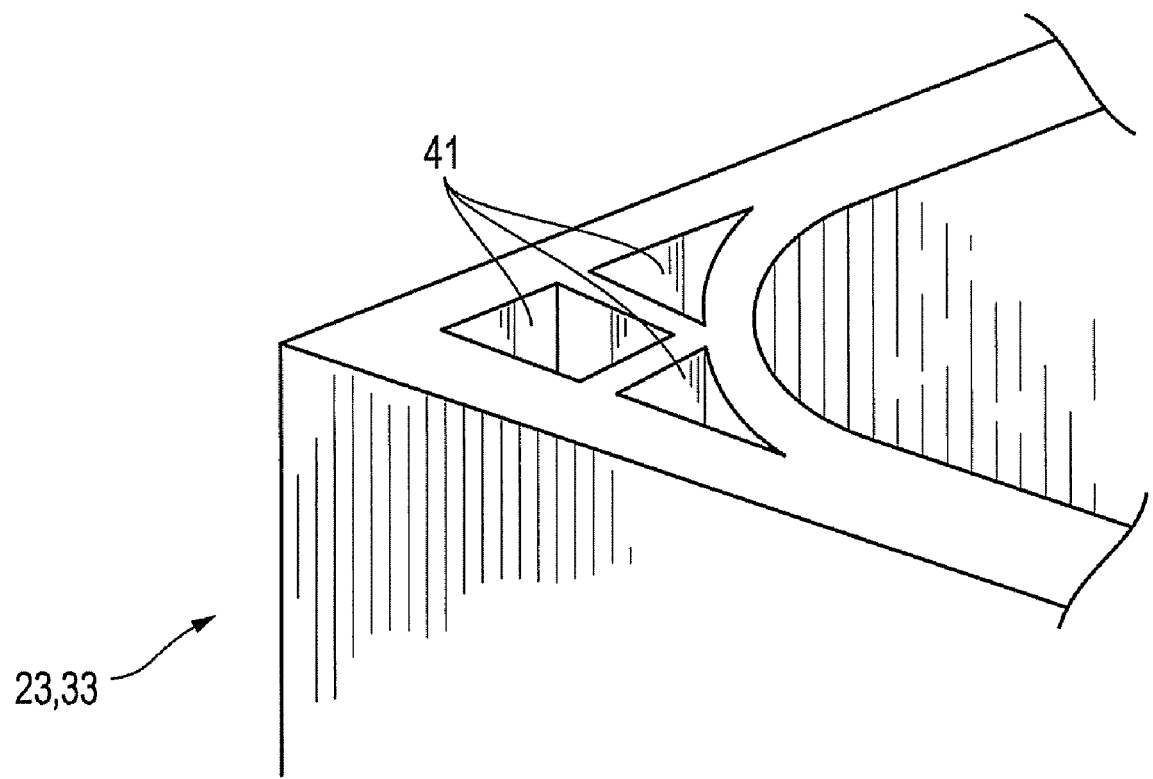
FIG. 4 is an enlarged isometric view of another portion of the leading edge of FIG. 3 and is constructed in accordance with the invention.

In some embodiments (e.g., FIG. 3), the leading edge is a one-piece structure 33. As shown in FIG. 3, the leading edge structure 33 may be configured to be detachably removable from the wing box 31 at the leading edge spar 35, and is therefore repairable or replaceable. The leading edge 33 may be mated to the wing box 31 with a mechanical assembly technique such as fastening or other methods.

The leading edge structure 23, 33 may be fabricated apart from the wing and then attached. This manufacturing technique permits the leading edge to be formed from refractory metals (e.g., W, Ta, Re, etc.), alloys (IN625, UDIMET 720, W-Re), high temperature ceramics, or other non-traditional materials. Thus, the leading edge structure 23, 33 may be formed from a first material, and other portions of the wing box 21, 31 may be formed from a second material. As shown in FIG. 3, the leading edge structure 33 comprises integrally formed stiffeners 39 that also may be formed from the first material.

In another embodiment (FIG. 4), the invention further comprises one or more cooling channels 41 that extend through the leading edge structure 23, 33 along the direction defined by the leading edge span. The cooling channels 41 comprise at least one fluid conduit (e.g., three shown) for communicating a fluid through the leading edge (such as tip 27 in FIG. 2) for reducing a temperature thereof.

Figure 5:
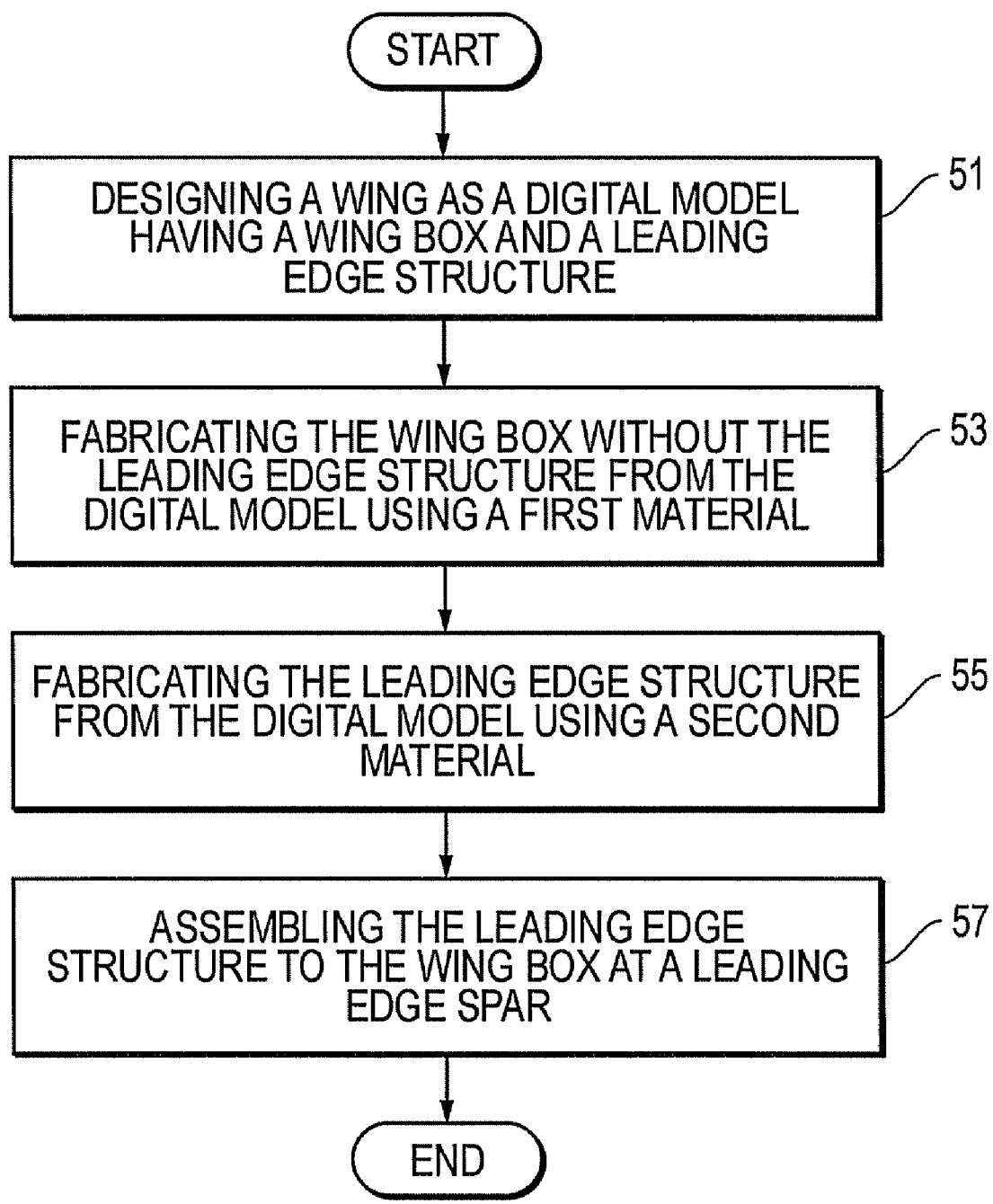
FIG. 5 is a high level flow diagram of one embodiment of a method in accordance with the invention.

The invention also comprises a method of forming a wing of an aircraft. As shown in FIG. 5, one embodiment of the method comprises designing a wing as a digital model having a wing box and a leading edge structure (step 51); fabricating the wing box without the leading edge structure from the digital model using a first material (step 53); fabricating the leading edge structure from the digital model using a second material (step 55); and assembling the leading edge structure to the wing box at a leading edge spar (step 57); before ending as indicated.

The method also may comprise selecting the second material from the group consisting of refractory metals, refractory alloys, and ceramics. The method may further comprise fabricating a replaceable tip separately from the leading edge structure, and then mechanically assembling the replaceable tip to the leading edge structure. In other embodiments, the method may further comprise: forming at least one cooling channel in the leading edge structure for circulating a fluid therethrough for cooling the leading edge structure; and/or forming stiffening elements in the leading edge structure; and/or forming the leading edge structure with a variable geometry along a span of the wing.

While the invention has been shown or described in only some of its forms, it should be apparent to those skilled in the art that it is not so limited, but is susceptible to various changes without departing from the scope of the invention.

What is claimed is:

1. An aircraft wing, comprising:
    a wing box formed from a first material;
    a leading edge structure formed from a second material and attached to the wing box, the leading edge structure being detachable from the wing box and replaceable;
    a cooling channel extending through the leading edge structure along a direction defined by a span of the leading edge, the cooling channel comprising at least one fluid conduit for communicating a fluid through the leading edge structure for reducing a temperature thereof; wherein
    the leading edge structure has a replaceable tip that is assembled to the leading edge structure with an assembly technique comprising a tolerance fit keyway joint; and
    the cooling channel extends through the replaceable tip.

2. An aircraft wing according to claim 1, wherein the second material is selected from the group consisting of refractory metals, refractory alloys, and ceramics.

3. An aircraft wing according to claim 1, wherein the leading edge structure comprises integrally formed stiffeners formed from the second material.

4. An aircraft wing according to claim 1, wherein the leading edge structure has a variable geometry extending in a direction defined by a span of the aircraft wing.

5. A method of forming a wing of an aircraft, comprising:
    (a) designing a wing as a digital model having a wing box, a leading edge structure, and a replaceable tip with a cooling channel extending therethrough;
    (b) fabricating the wing box without the leading edge structure from the digital model using a first material;
    (c) directly depositing the leading edge structure directly from the digital model using a second material to directly form the leading edge structure on the wing box at a leading edge spar thereof;
    (d) assembling the leading edge structure to the wing box at a leading edge spar; and
    (e) assembling the replaceable tip to the leading edge structure with an assembly technique comprising a tolerance fit keyway joint.

6. A method according to claim 5, wherein the second material is selected from the group consisting of refractory metals, refractory alloys, and ceramics.

7. A method according to claim 5, further comprising the steps of fabricating a replaceable tip separately from the leading edge structure, and then mechanically assembling the replaceable tip to the leading edge structure.

8. A method according to claim 5, further comprising forming at least one cooling channel in the leading edge structure for circulating a fluid therethrough for cooling the leading edge structure.

9. A method according to claim 5, further comprising forming stiffening elements in the leading edge structure.

10. A method according to claim 5, further comprising forming the leading edge structure with a variable geometry along a span of the wing.

11. A method of forming a wing of an aircraft, comprising:
    (a) designing a wing as a digital model having a wing box, a leading edge structure, and a replaceable tip;
    (b) fabricating the wing box without the leading edge structure from the digital model using a first material;
    (c) directly depositing the leading edge structure directly from the digital model using a second material to directly form the leading edge structure on the wing box at a leading edge spar thereof;
    (d) forming at least one cooling channel in the leading edge structure and in the replaceable tip for circulating a fluid therethrough for cooling the leading edge structure and the replaceable tip; and
    (e) assembling the replaceable tip to the leading edge structure with an assembly technique comprising a tolerance fit keyway joint.

12. A method according to claim 11, wherein the second material is selected from the group consisting of refractory metals, refractory alloys, and ceramics.

13. A method according to claim 11, further comprising the steps of fabricating a replaceable tip separately from the leading edge structure, and then mechanically assembling the replaceable tip to the leading edge structure.

14. A method according to claim 11, further comprising forming stiffening elements in the leading edge structure.

* * * * *